(12) United States Patent
Kim et al.

(10) Patent No.: US 9,481,280 B2
(45) Date of Patent: Nov. 1, 2016

(54) SEAT BACK SUSPENSION ASSEMBLY FOR VEHICLE AND METHOD OF MANUFACTURING THE SAME

(71) Applicants: Hyundai Motor Company, Seoul (KR); Daechang Seat Co., Ltd., Seoul (KR)

(72) Inventors: Tae Jo Kim, Ulsan (KR); Myung Soo Lee, Ulsan (KR); Hyo Jeong Kwon, Ulsan (KR)

(73) Assignees: Hyundai Motor Company, Seoul (KR); Daechang Seat Co., Ltd., Seoul (KR)

( * ) Notice: Subject to any disclaimer, the term of this patent is extended or adjusted under 35 U.S.C. 154(b) by 0 days.

(21) Appl. No.: 14/570,072

(22) Filed: Dec. 15, 2014

(65) Prior Publication Data
US 2016/0046223 A1 Feb. 18, 2016

(30) Foreign Application Priority Data

Aug. 12, 2014 (KR) ........................ 10-2014-0104245

(51) Int. Cl.
| | | |
|---|---|---|
| *B60N 2/70* | (2006.01) | |
| *B60N 2/72* | (2006.01) | |
| *B60N 2/64* | (2006.01) | |
| *B60N 2/68* | (2006.01) | |
| *B29C 45/14* | (2006.01) | |
| *B29K 23/00* | (2006.01) | |
| *B29L 31/00* | (2006.01) | |

(52) U.S. Cl.
CPC ............... *B60N 2/7011* (2013.01); *B60N 2/64* (2013.01); *B60N 2/68* (2013.01); *B60N 2/682* (2013.01); *B60N 2/7094* (2013.01); *B29C 45/14581* (2013.01); *B29K 2023/12* (2013.01); *B29L 2031/771* (2013.01)

(58) Field of Classification Search
CPC B60N 2/7047; B60N 2/7011; B60N 2/7094; B60N 2/68; B60N 2/64
USPC ............. 297/452.18, 452.52, 452.53, 452.54
See application file for complete search history.

(56) References Cited

U.S. PATENT DOCUMENTS

| | | | | |
|---|---|---|---|---|
| 8,870,292 | B2 * | 10/2014 | Sakai ................... | B60N 2/7017 297/452.14 |
| 2010/0133732 | A1 * | 6/2010 | Yamaguchi ............ | B60N 2/002 267/140.4 |

FOREIGN PATENT DOCUMENTS

| | | |
|---|---|---|
| KR | 10-0898375 B1 | 5/2009 |
| KR | 10-2012-0080308 A | 7/2012 |
| KR | 10-2012-0095047 A | 8/2012 |
| KR | 10-2012-0095048 A | 8/2012 |
| WO | WO 03/045732 A1 | 6/2003 |

* cited by examiner

*Primary Examiner* — Milton Nelson, Jr.
(74) *Attorney, Agent, or Firm* — Morgan, Lewis & Bockius LLP

(57) ABSTRACT

A seat back suspension assembly for a vehicle, disposed in a seat back frame inside a vehicle seat, may include a main wire including side wires extending in a vertical direction at left and right side thereof; at least one first support wire extending in a horizontal direction between the side wires at both sides thereof to allow both ends thereof to contact the side wires; at least one second support wire disposed to be spaced from the first support wire and extending in a horizontal direction between the side wires at both sides thereof to allow both ends thereof to contact the side wires; and a side guide injection-molded to cover the side wire and end portions of the first and second support wires contacting the side wire.

4 Claims, 4 Drawing Sheets

SEAT BACK SUSPENSION ASSEMBLY FOR VEHICLE AND METHOD OF MANUFACTURING THE SAME

CROSS-REFERENCE TO RELATED APPLICATION

The present application claims priority to Korean Patent Application No. 10-2014-0104245 filed Aug. 12, 2014, the entire contents of which is incorporated herein for all purposes by this reference.

BACKGROUND OF THE INVENTION

1. Field of the Invention

The present invention relates to a seat back suspension assembly for a vehicle and a method of manufacturing the seat back suspension assembly. Particularly, the present invention relates to a seat back suspension assembly for a vehicle and a method of manufacturing the seat back suspension assembly, which is disposed at a seat back frame inside a vehicle seat to support passenger's waist and back.

2. Description of Related Art

Generally, seats are installed in a vehicle to allow passengers to sit thereon. These seats include a seat cushion supporting passenger's hip, a seat back supporting passenger's back, an armrest on which a passenger can put his/her arms, and a headrest supporting passenger's head.

A seat back frame is installed inside the seat back to support the seat back, and a seat back suspension assembly is installed inside the seat back frame to support passenger's waist and back.

A typical seat back suspension assembly includes a main wire having a plurality of support wires disposed in a horizontal direction of the seat back frame and side wires disposed in a vertical direction at both ends of the support wire to fix the plurality of support wires. In this case, since both ends of each support wire need to be wound around the side wire to be fixed, the workability and the assembling efficiency are reduced.

Also, a portion of the support wires is cut to have an appropriate extra portion at the both ends thereof such that the support wires are wound around the side wires and then are fixed to the seat back frame, and the other portion of the support wires are cut without the extra portion after being wound around the side wire to be fixed. In this case, due to sharp end portions of the support wires that are cut without an extra portion, a worker or a passenger may be injured during the suspension assembling or in a vehicle accident.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a seat back suspension assembly for a vehicle and a method of manufacturing the seat back suspension assembly, which can improve the assembling efficiency between components and the marketability by preventing injuries caused by sharp end portions of wire members.

In an aspect of the present invention, a seat back suspension assembly for a vehicle, disposed in a seat back frame inside a vehicle seat, may include a main wire including side wires extending in a vertical direction at left and right side thereof, at least one first support wire extending in a horizontal direction between the side wires at both sides thereof to allow both ends thereof to contact the side wires, at least one second support wire disposed to be spaced from the first support wire and extending in a horizontal direction between the side wires at both sides thereof to allow both ends thereof to contact the side wires, and a side guide injection-molded to cover the side wire and end portions of the first and second support wires contacting the side wire.

The first support wire may include a contact part formed at both ends thereof and contacting a rear surface portion of the side wire, and a hook part integrally formed to extend from the both ends of the first support wire.

The second support wire may include a curved part formed at both ends thereof to cover a front surface portion of the side wire.

The side guide may include a main body covering the side wire, and a rotation preventing part covering a contact part of the first support wire contacting the side wire.

The side guide may include a main body covering the side wire, and an injury preventing part covering a contact part of the second support wire contacting the side wire.

The seat back suspension assembly may further include a center guide injection molded at centers of the first support wire and the second support wire and extending in a vertical direction to connect the centers of the first and second support wires.

In another aspect of the present invention, a method of manufacturing a seat back suspension assembly for a vehicle, may include preparing a wire part including a main wire including side wires extending in a vertical direction at left and right side thereof, at least one first support wire extending in a horizontal direction between the side wires at both sides thereof to allow contact parts of both ends thereof to contact the side wires, and at least one second support wire disposed to be spaced from the first support wire and extending in a horizontal direction between the side wires at both sides thereof to allow curved parts of both ends thereof to partially cover the side wires, and inserting the wire part into an injection mold and then injection-molding a side guide covering the side wire, the contact part of the first support wire, and the curved part of the second support wire.

The method may further include injection-molding a center guide connecting centers of the first support guide and the second support guide that are arranged in a vertical direction.

The method may further include injection-molding a clip mounting part at a center of a lower wire of the main wire.

Other aspects and exemplary embodiments of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
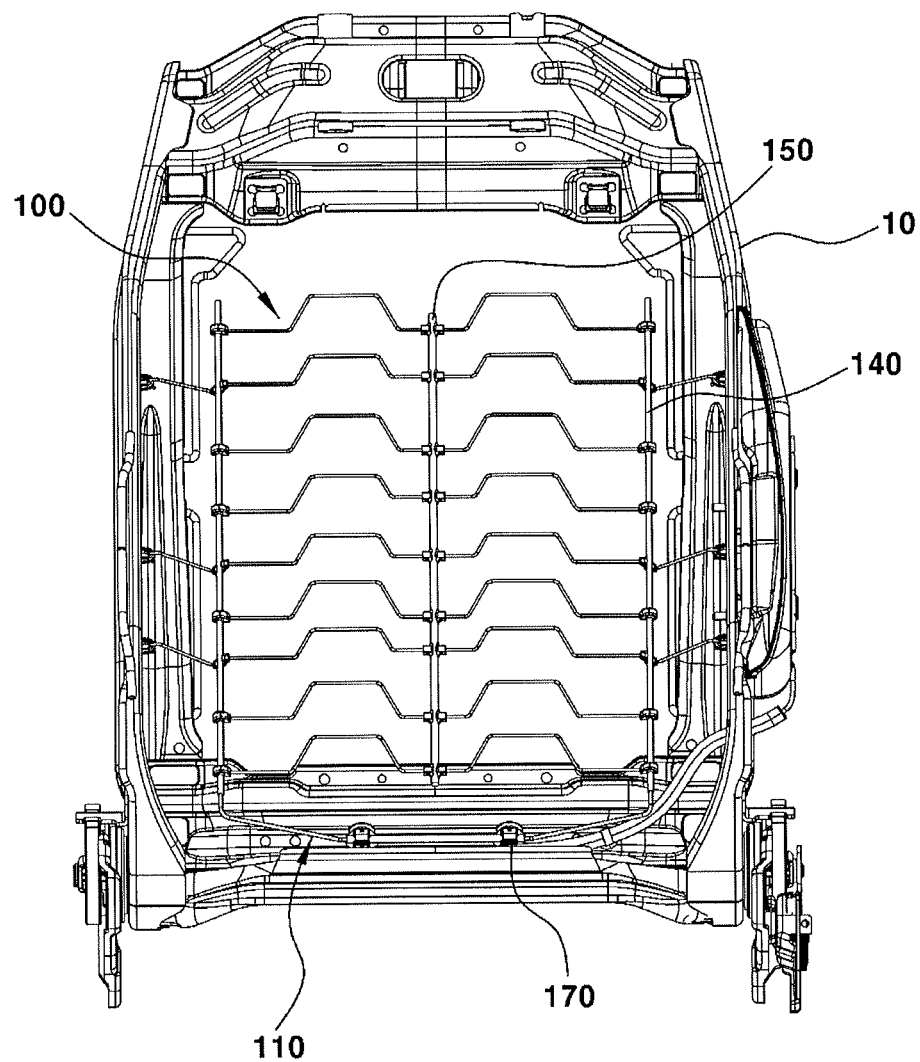
FIG. 1 is a view illustrating a seat back suspension assembly disposed in a seat back frame according to an exemplary embodiment of the present invention.

Reference numerals set forth in the Drawings includes reference to the following elements as further discussed below, It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

Hereinafter, exemplary embodiments of the present invention will be described in detail with reference to the accompanying drawings so that those skilled in the art can easily carry out the present invention.

Figure 2:
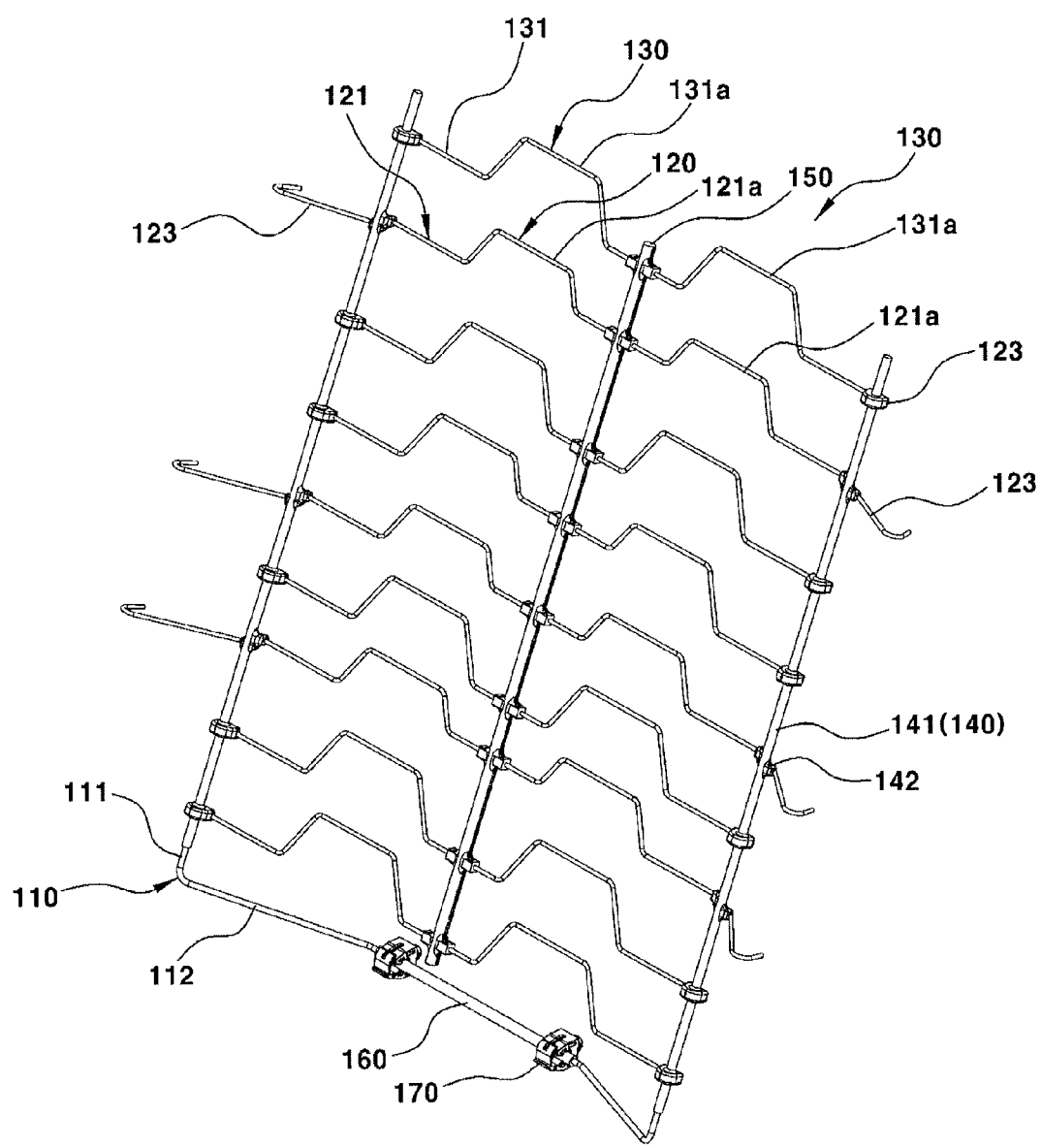
FIG. 2 is a view illustrating a seat back suspension assembly for a vehicle according to an exemplary embodiment of the present invention.

The present invention relates to a seat back suspension assembly that is disposed in a seat back frame inside a vehicle seat to support the back and waist of a passenger. FIGS. 1 and 2 show a seat back suspension assembly 100 including a main wire 110 and first and second support wires 120 and 130.

The main wire 110 may include a side wire 111 extending in a vertical direction at both left and right sides and a lower wire 112 integrally formed at a lower end of the side wire 111 to integrally connect the left and right side wires 111. The main wire 110 may be formed of a wire material having a certain thickness, and may have an opened U-shape. The main wire 110 may be coupled to a seat back frame 10 by a fixing clip 170 provided on the lower wire 112.

The side wire 111 may be formed to have a straight shape without a bent portion, and the lower wire 112 may be bent two times at a middle part thereof.

Here, the main wire 110 and the first and second support wires 120 and 130 may be all secured in straightness of a wire material using a wire straightening machine, and may be bent at a certain portion by a wire bending machine.

The first support wire 120 may connect between left and right side wires 111, and may be disposed to extend in a horizontal direction. The first support wire 120 may be arranged in plurality to be spaced from each other in a vertical direction (i.e., a longitudinal direction of the side wire 111). Both end portions (contact part 122 of the first support wire 120) of the first support wire 120 may be fixed to one side of both side wires 111, respectively.

Figure 3:
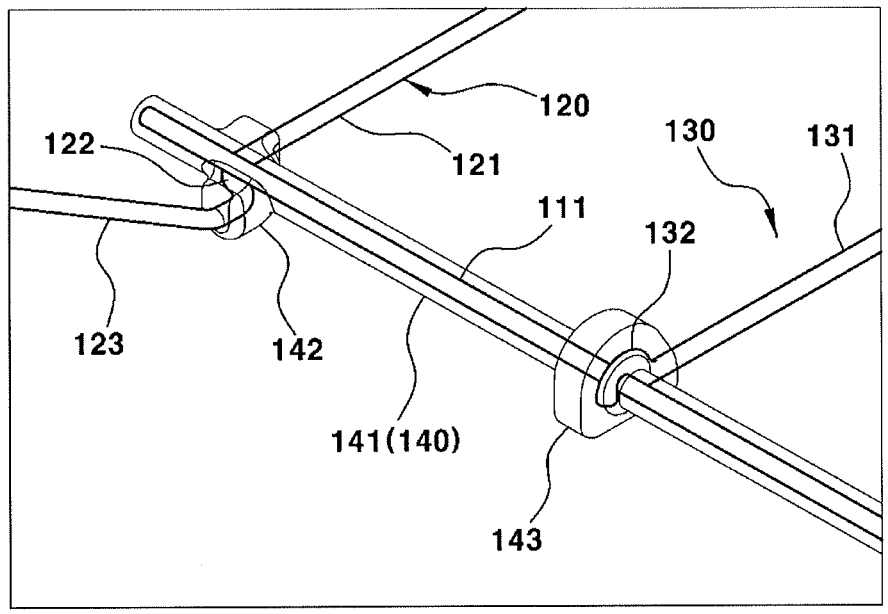
FIG. 3 and FIG. 4 are magnified views illustrating portions of a seat back suspension assembly according to an exemplary embodiment of the present invention.

As shown in FIG. 3, the contact part 122 may simply contact a rear surface portion of the side wire 111, and may be fixed to one side of the side wire 111 by a side guide 140.

More specifically, the first support wire 120 may include a first center part 121 disposed between left and right side wires 111. Both end portions of the first center part may be downwardly bent and then may be orthogonally bent toward the outside of the side wire 111. In this case, the first support wire 120 may be bent two times, and may include the contact part 122 that simply contacts one rear surface portion of the side wire 111.

The first support wire 120 may include a hook part 123 integrally formed to extend from the contact part 122, and may be coupled to a side portion of the seat back frame 10 through the hook part 123.

The first center part 121 may include a plurality of bending part 121a formed at the center the first center part 121 to elastically support the back of a passenger. For example, the bending part 121a may be bilaterally symmetrical about a center guide 150. In this case, the bending part 121a may have a U-shape that is rotated by about 90 degrees.

As shown in FIG. 2, the second support wire 130 may connect between left and right side wires 111, and may be disposed to extend in a horizontal direction. The second support wire 130 may be arranged in plurality to be spaced from each other in a vertical direction (i.e., a longitudinal direction of the side wire 111). In this case, the second support wire 130 may be arranged so as to be spaced from the first support wire 120 in a vertical direction.

Also, the second support wire 130 may include curved parts 132 fixed to the left and right side wires 111 at both ends of the second support wire 130, respectively.

As shown in FIG. 3, the curved part 132 may have a semicircular shape so as to surround the front surface portion (portion facing the back of a passenger sitting on a seat) of the side wire 111 having a circular cross-sectional structure, and may be fixed to one side of the side wire 111 by the side guide 140.

More specifically, the curved part 132 may integrally formed to extend from the end of a second center part 131 connecting between the left and right side wires 111. The curved part 132 may be bent to have a semicircular shape contacting the front surface portion of the side wire 111, and may be surrounded by the side guide 140 covering the side wire 111 to be fixed to one side of the side wire 111.

In this case, the second center part 131 may include a plurality of bending part 131 a formed at the center the second center part 131 to elastically support the back of a passenger. For example, the bending part 131 a may be bilaterally symmetrical about the center guide 150. In this case, the bending part 131a may have a U-shape that is rotated by about 90 degrees.

The side guide 140 may be formed to surround the side wire 111 and the curved part 122 of the first support wire 120 and the curved part 132 of the second support wire 130 which contact the side wire 111. The side guide 140 may include a main body 141 surrounding the side wire 111, a rotation preventing part 142 surrounding the contact part 122, and an injury preventing part 143 surrounding the curved part 132.

The side guide 140 may be injection-molded using a plastic material in an injection mold into which the main wire 110 and the first and second support wires 120 and 130 are inserted. The side guide 140 may cover the side wire 111 and the contact part 122 and the curved part 132 that contact the side wire 111, fixing the contact part 122 and the curved part 132 to one side of the side wire 111 and preventing the rotation and floating of the curved part 122 and injuries caused by a sharp end portion of the curved part 132.

Figure 4:
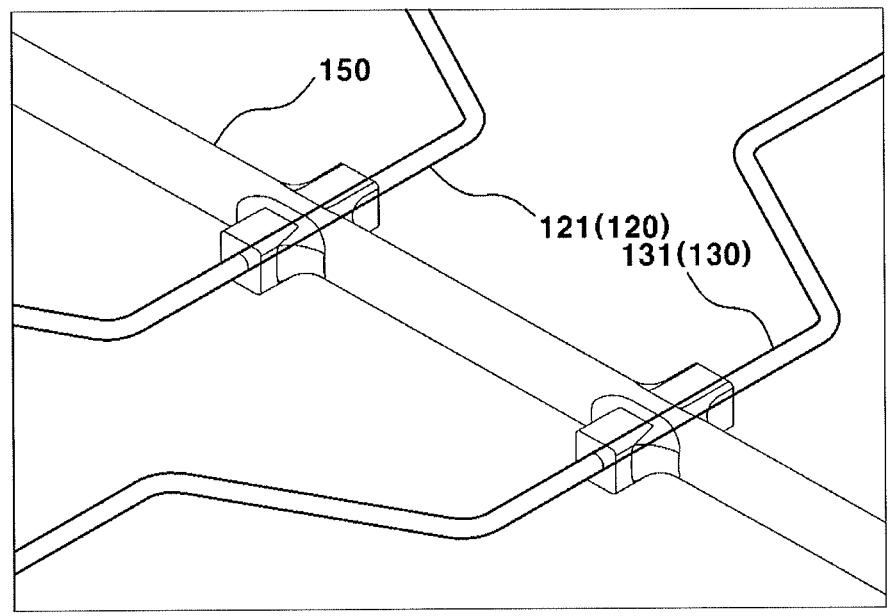

As shown in FIG. 4, the center guide 150 may be disposed at the center of the first support wire 120 and the second support wire 130, i.e., between the left and right bending parts 121a of the first center part 121 and the left and right bending parts 131a of the second center part 131, extending in a vertical direction (a longitudinal direction of the side wire 111) to connect the central parts of the first support wire 120 and the second support wire 130.

The center guide 150 may be formed simultaneously with the injection molding of the side guide 140. Similarly to the side guide 140, the center guide 150 may be injection-molded using a plastic material in an injection mold into which the first support wire 120 and the second support wire 130 are inserted.

In this case, the center guide 150 may be provided in a coated form at the central part of the first support wire 120 and the second support wire 130.

In addition, a clip mounting part 160 may be disposed at the center of the lower wire 112 of the main wire 110, and may be injection-molded using a plastic material in a coated form. The clip mounting part 160 may be formed simultaneously with the formation of the side guide 140 and the center guide 150.

Hereinafter, a process of manufacturing the seat back suspension assembly 100 will be described with reference to FIG. 5.

Figure 5:
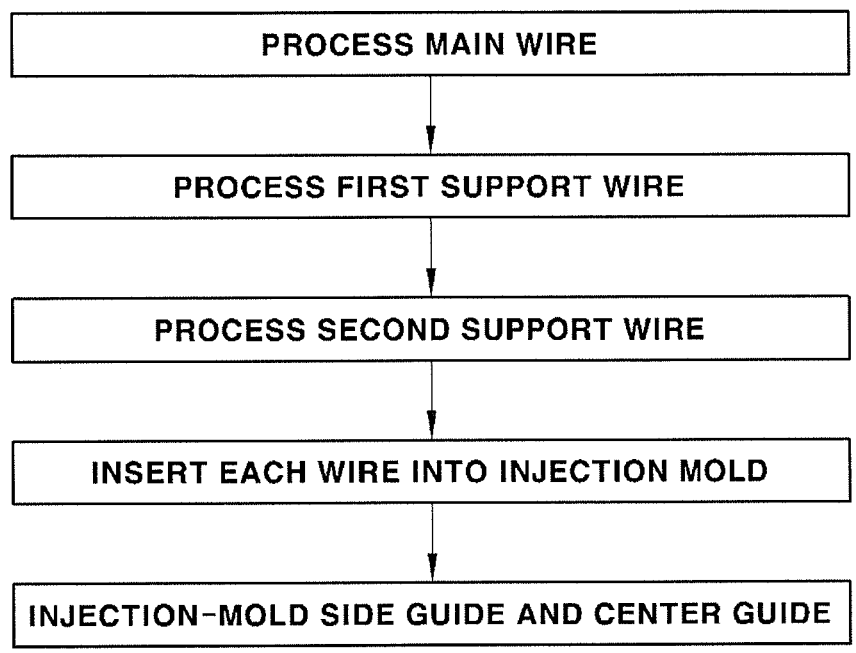
FIG. 5 is a view illustrating a process of manufacturing a seat back suspension assembly according to an exemplary embodiment of the present invention.

As shown in FIG. 5, the process of manufacturing the seat back suspension assembly 100 may include preparing a wire part including the main wire 110 and the first and second support wires 120 and 130, partially covering the wire part by inserting the wire part into an injection mold and then injection-molding the side guide 140, the center guide 150, and the clip mounting part 160. During the partial covering of the wire part, the first and second support wire 120 and 130 may be fixed to the main wire 110.

The preparing of the wire part may include processing the main wire 110 including the side wire 111 extending in a longitudinal direction (vertical direction) at left and right sides, processing at least one first support wire 120 including the hook part 123 extending from both ends of the first center part 121 extending in a transverse direction (left and right direction) and the contact part 122 formed between the first center part 121 and the hook part 123, and processing at least one second support wire 130 including the second center part 132 extending in a transverse direction (left and right direction) and the curved part 132 formed at both ends of the second center part 132.

In this case, the main wire 110 and the first and second support wires 120 and 130 may be each secured in straightness of a wire material (hard steel wire) using a wire straightening machine, and may be bent into a desired shape by a wire bending machine.

Also, during the processing of the first support wire 120 and the second support wire 130, the first center part 121 and the second center part 131 may be processed to have a plurality of bending parts 121a and 131a at the center thereof, respectively.

When the wire part is disposed in an injection mold, the contact part 122 at both sides of the first support wire 120 and the curved part 132 at both sides of the second support wire 130 may be placed so as to contact the side wire 111 of the main wire 110. In this case, one of the contact part 122 and the curved part 132 may be stacked on the rear side of the side wire 111 so as to contact the rear surface portion of the side wire 111, and the other may be stacked on the front side of the side wire 111 so as to contact the front surface portion of the side wire 111.

For example, a plurality of first support wires 120 may be first inserted into an injection mold so as to be spaced from each other in a vertical direction, and then the main wire 110 may be inserted into the injection mold such that the side wire 111 at left and right sides contact the contact part 122 of the first support wire 120. Thereafter, the second support wire 130 may be inserted into the injection mold so as to be spaced from each other in a vertical direction and also spaced from the first support wire 120 in a vertical direction. Also, the curved part 132 at both sides may be disposed so as to be placed on the front surface portion of the side wire 111.

Next, the partial covering of the wire part may include injection-molding the side guide 140 to cover the side wire 111, the contact part 122 of the first support wire 120 contacting the side wire 111, and the curved part 132 of the second support wire 130, injection-molding the center guide 150 having a straight-line shape and simultaneously connecting the center of the first support wire 120 and the second support wire 130, and injection-molding the clip mounting part 160 at the center of the lower wire 112 of the main wire 110.

In this case, the side guide 140, the center guide 150, and the clip mounting part 160 may be formed by injecting a plastic resin such as polypropylene (PP) into an injection mold.

In the injection-molding of the side guide 140, the first and second support wires 120 and 130 may be connected and fixed to the side wire 111 of the main wire 110, and the central parts of first support wire 120 and the second support wire 130 may be connected to each other.

Thus, the seat back suspension assembly 100 manufactured in a mold may be drawn out of the mold, and then may undergo subsequent processes to be installed in the seat back frame (see FIG. 1).

According to the exemplary embodiments of the present invention, it is possible to improve the assembling efficiency between components constituting the seat back suspension assembly and improve the marketability by preventing injuries caused by sharp end portions of wires.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A seat back suspension assembly for a vehicle, disposed in a seat back frame inside a vehicle seat, the seat back suspension assembly comprising:
    a main wire comprising side wires extending in a vertical direction at left and right sides thereof;
    at least one first support wire extending in a horizontal direction between the side wires at first and second sides thereof to allow first and second ends thereof to contact the side wires;
    at least one second support wire disposed to be spaced from the first support wire and extending in a horizontal direction between the side wires at the first and second sides thereof to allow first and second ends thereof to contact the side wires; and
    side guides injection-molded to cover the side wires and end portions of the first and second support wires contacting the side wires,
    wherein each of the side guides comprises:
        a main body covering one of the side wires;
        a rotation preventing part covering a contact part of the first support wire contacting one of the side wires and a contact part of a hook part contacting one of the side wires, wherein the hook part is integrally formed to extend from the first and second ends of the first support wire in a horizontal direction of the vehicle seat; and
        an injury preventing part covering a contact part of the second support wire contacting one of the side wires.

2. The seat back suspension assembly of claim 1, wherein the first support wire comprises:
    contact parts formed at the first and second ends thereof and contacting a rear surface portion of the side wires.

3. The seat back suspension assembly of claim 1, wherein the second support wire comprises a curved part formed at the first and second ends thereof to cover a front surface portion of the side wires.

4. The seat back suspension assembly of claim 1, further comprising a center guide injection molded at centers of the first support wire and the second support wire and extending in a vertical direction to connect the centers of the first and second support wires.

* * * * *